United States Patent [19]

Beckmann et al.

[11] Patent Number: 4,708,471
[45] Date of Patent: Nov. 24, 1987

[54] OPTICAL TIME-DOMAIN REFLECTOMETER USING HETERODYNE RECEPTION

[75] Inventors: Friedrich-Karl Beckmann, Pinneberg; Wolfgang Hoppe, Norderstedt; Reinhard Knöchel, Elmshorn, all of Fed. Rep. of Germany

[73] Assignee: U.S. Philips Corporation, New York, N.Y.

[21] Appl. No.: 832,289

[22] Filed: Feb. 21, 1986

[30] Foreign Application Priority Data

Feb. 27, 1985 [DE] Fed. Rep. of Germany ....... 3506884

[51] Int. Cl.$^4$ ...................... G01N 21/84; G01N 21/88
[52] U.S. Cl. .................................................. 336/73.1
[58] Field of Search ............... 356/73.1, 349, 350/358

[56] References Cited

FOREIGN PATENT DOCUMENTS

| 56-14739 | 2/1981 | Japan . | |
|---|---|---|---|
| 58-106526 | 6/1983 | Japan | 350/358 |
| 1563993 | 4/1980 | United Kingdom | 356/73.1 |
| 2136113 | 9/1984 | United Kingdom | 356/73.1 |

OTHER PUBLICATIONS

Abbas, G. L. et al., "Local-Oscillator Excess-Noise Suppression for Homodyne and Heterodyne Detection", *Opt. Lett.*, vol. 8, No. 8, pp. 419–421 (Aug., 1983).

Healey, P., "Fading in Heterodyne OTDR." *Elec. Lett.*, vol. 20, No. 1, pp. 30–32 (Jan. 5, 1984).

Wright, S., et al., "High Dynamic Range Coherent Reflectometer for Fault Location In Monomode and Multimode Fibres." *9th ECOC*, pp. 177–180 (1983).

*Primary Examiner*—Vincent P. McGraw
*Attorney, Agent, or Firm*—Marc D. Schechter

[57] ABSTRACT

The invention relates to an optical time-domain reflectometer (OTDR) using heterodyne reception for determining the attenuation of an optical fiber guide by measuring the backscattered portion of light pulses launched into the fiber. The reflectometer comprises a light source whose light is split into a local-oscillator beam and a measuring beam. The measuring beam is pulsed by an acousto-optical modulator (AOM) and is then launched into the optical fiber to be tested. The measuring beam thus has a frequency which is offset from the optical frequency by an acoustic frequency. The local-oscillator beam and the back-scattered portion of the measuring beam are both directed to an optical receiver producing an electric output signal. A component of the output signal has a frequency corresponding to the acoustic frequency. The time-dependent amplitude of this component is a measure of the length-dependent attenuation of the optical fiber. In order to reduce the losses in the path between the light source and the optical receiver via the fiber to be tested, the acousto-optical modulator (AOM) also functions as an optical deflection element.

10 Claims, 4 Drawing Figures

OPTICAL TIME-DOMAIN REFLECTOMETER USING HETERODYNE RECEPTION

BACKGROUND OF THE INVENTION

The invention relates to an optical time-domain reflectometer (OTDR) using heterodyne reception for determining the attenuation of an optical fiber by measuring the backscattered portion of light pulses launched into the fiber. The reflectometer comprises a light source whose light is split into a local-oscillator beam and a measuring beam. The measuring beam is pulsed by an acousto-optical modulator (AOM), and is launched into the fiber to be tested with a frequency which is offset from the optical frequency by an acoustic frequency. The local-oscillation beam and the backscattered portion of the measuring beam are both directed to an optical receiver producing an electric output signal. A signal of a frequency corresponding to the acoustic frequency is obtained from the output signal. The time-dependent amplitude of the acoustic frequency output signal is a measure of the length-dependent attenuation of the optical fiber.

Such an arrangement is described in an article by S. Wright et al. entitled "High Dynamic Rouge Coherent Reflectometer For Fault Location in Monomode and Multimode Fibers" (ECOC 83—9th European Conference on Optical Communication, pages 177 to 180). This arrangement employs an acousto-optical modulator (AOM) only for shifting the optical frequency of the signal emitted by a light source. To split the light emitted by a laser, a beam splitter is used. To couple the light signals into and out of the test fiber a fiber coupler is employed. As a result of this, only a small part of the light energy emitted by the light source reaches the optical receiver via the test fiber. The heterodyne reception of such an OTDR produces a substantial improvement in signal-to-noise ratio (S/N). However, the gain in sensitivity is reduced as a result of substantial losses in the arrangement.

SUMMARY OF THE INVENTION

It is an object of the invention to reduce the losses in the path from the light source to the optical receiver via the test fiber.

In the reflectometer according to the invention, the acousto-optical modulator (AOM) also functions as an optical deflection element.

In an advantageous embodiment of the invention, the light from the light source is passed through a first fiber coupler to route most of the light via the AOM into the test fiber and to tap off a small part as the local oscillator beam. The back-scattered portion of the light launched into the test fiber is transmitted, via the AOM without being deflected, together with the local oscillator beam to the optical receiver by means of a second fiber coupler.

In a very advantageous embodiment of the invention, the local oscillator beam is formed by the part of the light beam from the light source which is transmitted without diffraction by the AOM. The local-oscillator beam is subsequently routed to the optical receiver via an intermediate AOM which also transmits this beam without diffraction. The measuring beam is formed by the part of the light beam from the light source that is diffracted by the AOM. The measuring beam is sent into the test fiber via the intermediate AOM without being diffracted. The back-scattered portion of the measuring beam is directed to the optical detector via diffraction in the intermediate AOM which is excited with an acoustic-frequency $f_a+f_z$.

According to the invention, the AOM has a double function as a modulator and as a beam deflection element. Therefore, an additional passive optical element can be dispensed with so that the internal attenuation of the arrangement is reduced.

The most preferred embodiment described above has the additional advantage that as a result of the use of an intermediate AOM, it is possible to gate the scatter signal, enabling the attenuation in selected portions of the test fiber to be measured. In addition, the electrically processed intermediate frequency can be selected freely and lower, which enables the electrical circuitry to be simplified.

DESCRIPTION OF THE PREFERRED EMBODIMENTS

Figure 1:
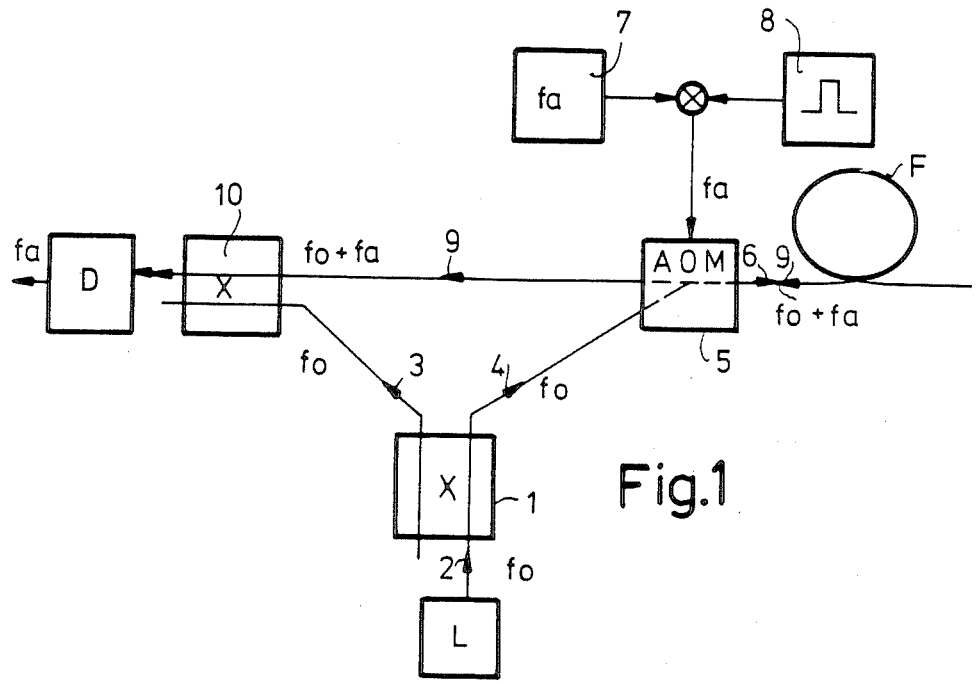
FIG. 1 schematically shows a first embodiment of the invention.

The arrangement shown in the drawing enables the attenuation in a test fiber F to be measured. A light source, for example a laser L, launches light into the fiber F. The back-scattered portion of this light is measured by an optical receiver or detector D, which converts optical signals into corresponding electric signals.

For optical time-domain reflectometry (OTDR) using beat reception according to the heterodyne principle, it is necessary to superimpose a local-oscillator frequency on the signal frequency received. These two frequencies differ by a comparatively small difference frequency. The difference frequency is preferably low in order to simplify the electronic processing circuitry for the difference signals.

A fiber coupler 1 splits the laser beam 2 which is emitted at a frequency $f_o$ into a local oscillator beam 3 and a measuring beam 4. The fiber coupler 1 is constructed in such a way that the measuring beam 4 has approximately 75% of the power of the laser beam 2 and the local-oscillator beam 3 about 25% (a 6-dB coupler). A higher power measuring beam 4 is more important than a higher power local-oscillator beam in order to ensure low-noise measurements with a high sensitivity.

The optical frequency of the measuring beam is increased by the value $f_a$ in the acousto-optical modulator (AOM) 5. This beam is launched into the test fiber F in a direction as indicated by the arrow 6. For this purpose it is required to excite the AOM 5 with the acoustic frequency $f_a$ by means of the frequency generator 7. The gate switch 8 ensures that only short-duration pulse trains of the measuring beam 4 can reach the fiber F.

After each pulse train, the measuring operation begins. The AOM 5, which is no longer acoustically excited and hence does not provide diffraction, routes the portion 9 of the frequency-shifted measuring beam 6 which is backscattered from the individual points along the test fiber F to the optical receiver D via a second 6 dB fiber coupler 10 together with the local-oscillator beam 3. The fiber coupler 10, is constructed in such a way that it trasmits approximately 75% of the beam 9 and approximately 25% of the beam 3.

The signal component with the difference frequency $f_a$ is extracted from the mixed signal in the receiver D and is measured.

Figure 3:
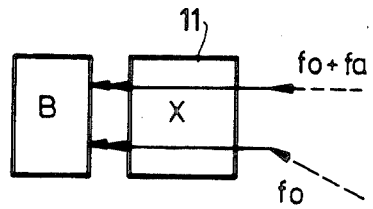
FIG. 3 schematically shows an advantageous modification of the optical receiver FIG. 1.

The arrangement shown in FIG. 1 is simple and has low internal losses, so that the receiver D receives comparatively large backscatter signals. The sensitivity and the signal-to-noise ratio S/N can be improved even further if instead of the 6-dB fiber coupler 10, a 3-dB coupler 11 as shown in FIG. 3 is employed. Such a coupler 11 mixes the incoming signals of local-oscillator frequency $f_o$ and the backscattered light (frequency $f_o + f_a$) symmetrically and splits it into equal parts at two outputs. The two parts are sent to the two inputs of a balanced receiver B which is constructed in known manner. (See, for example, Abbas, G. L., et al. "Local-oscillator excess noise suppression for homodyne and heterodyne detection." *Optics Letters*, Vol. 8, No. 8 pages 419 to 421, August 1983).

Figure 2:
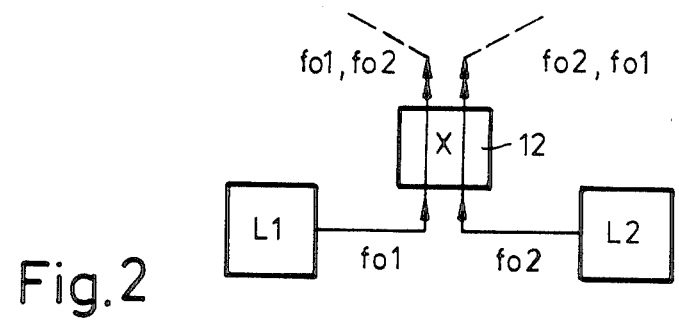
FIG. 2 shows an advantageous modification of the light source for the embodiment shown in FIG. 1.

Further it is possible to replace the 6-dB fiber coupler 1 shown in FIG. 1 with a 3-dB fiber coupler 12 as shown in FIG. 2, and to employ two lasers $L_1$ and $L_2$ with different frequencies $f_{o1}$ and $f_{o2}$ as light sources. If the spacing between the two laser frequencies is large enough, the lasers will not influence each other. For each individual laser the OTDR then operates as described above.

Since the two laser signals are frequency-shifted in the same AOM they add to each other after mixing with the signals of the associated local-oscillator frequency. Consequently, a higher power is obtained at the output of the optical receiver. At the same time, the risk of drop outs as a result of fading is reduced. (See, Healy, P. "Fading in Heterodyne OTDR." *Electronics Letters*, Vol. 20, No. 1, pages 30 to 32 Jan. 5, 1984.) This is because the light is emitted by two sources which are independent of one another.

Figure 4:
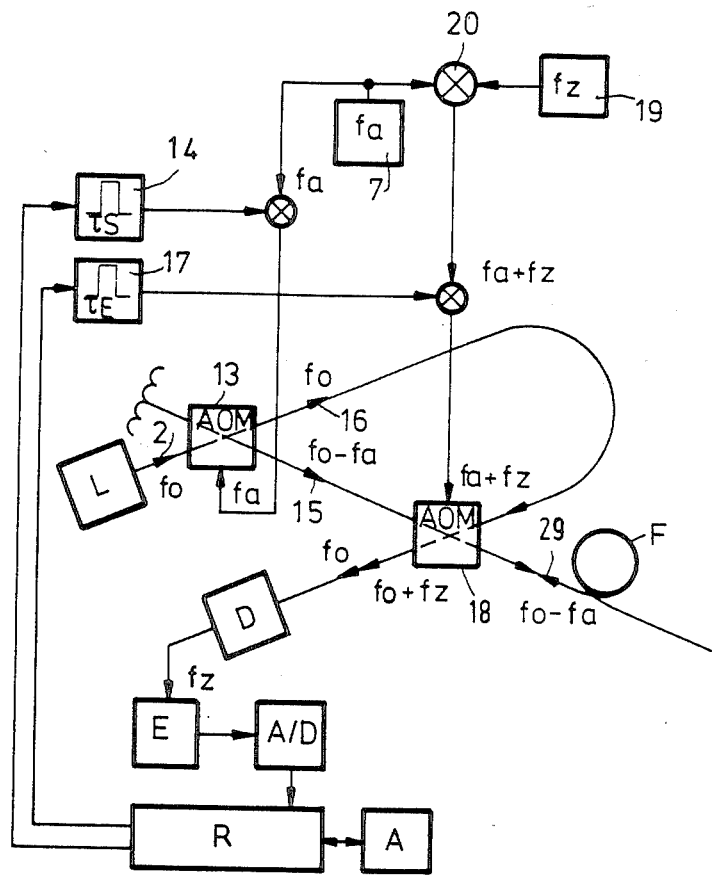
FIG. 4 schematically shows a second embodiment of the invention comprising two acousto-optical modulators used for a plurality of functions.

FIG. 4 shows a measuring arrangement which has a very low attenuation and consequently a high signal-to-noise ratio S/N.

The láser L sends light 2 of the frequency $f_o$ into the AOM 13. During during the transmission time $\tau_s$, determined by the gate switch 14, AOM 13 is excited with the acoustic frequency $f_a$ supplied by the frequency generator 7.

A measuring beam 15, which has an optical frequency $f_o - f_a$ is then deflected and launched into the test fiber F via the intermediate AOM 18 which is not excited during the transmission time $\tau_s$. At the end of the transmission time $\tau_s$, the beam 2 of the laser source L is used as the local oscillator beam which is not frequency-shifted, and the AOM is no longer excited.

During the receiving time $\tau_e$, which is dictated by the gate switch 17, the second AOM 18 is acoustically excited with the frequency $f_a + f_z$, supplied by the frequency generators 7 and 19 via the summing network 20.

The local-oscillator beam 16 is launched directly and consequently without a frequency shift into the optical fiber which leads to the detector. After a frequency shift by $+(f_a + f_z)$ the backscattered signal 29 from the fiber F is launched into the input fiber of the optical receiver with an optical frequency $f_o + f_z$. The electrical receiver E only processes the signal of the intermediate frequency, and supplies this signal to the computer R via the analog-to-digital converter A/D. The computer R controls all the operations, in particular the gate switches 14 and 17, and displays the average amplitudes of a multitude of backscattered signals on the display A as a function of the distance of the backscatter points of the fiber.

A measuring arrangement as shown in FIG. 4 has a very low attenuation in the path from the source laser L into the fiber and from the fiber back into the receiver D. The intermediate frequency $f_z$ may be selected to be arbitrarily lower than the minimum frequency necessary for exciting the AOM, which simplifies the electronic circuitry in comparison with known arrangements in which the higher frequency $f_a$ is the intermediate frequency.

In addition, the arrangement shown in FIG. 4 has the advantage that the gate switch 17 enables exact control of the time intervals during which the backscattered signal is to be measured. For example, it is then possible to suppress the starting period so that the very high amount of Fresnel reflections during this period are not considered. It is also possible to test specific portions along the test fiber F.

What is claimed is:

1. An optical time-domain reflectometer comprising:
    a light source for producing a light beam of frequency $f_o$;
    a beam splitter for dividing the light beam into a local oscillator beam and a measuring beam;
    an acousto-optical modulator arranged to receive the measuring beam, to direct the measuring beam into an optical fiber to be measured, and to receive a portion of the measuring beam which is backscattered from the fiber, said acousto-optical modulator being capable of directing the backscattered beam away from the beam splitter when the acousto-optical modulator is in a first state, said acousto-optical modulator being capable of shifting the frequency of the measuring beam by an acoustic frequency $f_a$ when the acousto-optical modulator is in a second state different from the first state;
    a receiver arranged to receive the local oscillator beam from the beam splitter and arranged to receive the backscattered beam from the acousto-optical modulator, said receiver producing an electrical output signal in proportion to the intensity of the light beams incident thereon, said receiver having a frequency response greater than or equal to the acoustic frequency $f_a$; and
    means for exciting the acousto-optical modulator into the second state for a short duration to direct a measuring beam pulse of frequency $f_o + f_a$ into the optical fiber.

2. A reflectometer as claimed in claim 1, characterized in that:
    the beam splitter divides the light beam such that the intensity of the measuring beam exceeds the intensity of the local oscillator beam; and
    the device further comprises a coupler for receiving the local oscillator beam from the beam splitter, for receiving the backscattered beam from the acousto-optical modulator, for combining the local oscillator beam and the backscattered beam, and for directing the combined beam to the receiver.

3. A reflectometer as claimed in claim 2, characterized in that the coupler attenuates the local oscillator beam and the backscattered beam, the attenuation of the backscattered beam being less than the attenuation of the local oscillator beam.

4. A reflectometer as claimed in claim 2, characterized in that:
the coupler combines the local oscillator beam and the backscattered beam into two output beams of equal intensity; and
the device further comprises a balanced receiver for receiving the two output beams.

5. A reflectometer as claimed in claim 1, further comprising a second light source producing a light beam of a frequency different from $f_o$, said light beam being incident on the beam splitter.

6. An optical time-domain reflectometer comprising:
a light source for producing a light beam of frequency $f_o$;
a first acousto-optical modulator arranged to receive the light beam, said first acousto-optical modulator being capable of directing the light beam in a first direction to produce a local oscillator beam when the first acousto-optical modulator is in a first state, said first acousto-optical modulator being capable of directing the light beam in a second direction different from the first direction to produce a measuring beam when the first acousto-optical modulator is in a second state different from the first state, said first acousto-optical modulator shifting the frequency of the local oscillator beam relative to the measuring beam by an acoustic frequency $f_a$;
a second acousto-optical modulator arranged to receive the measuring beam, to direct the measuring beam into an optical fiber to be measured, and to receive a portion of the measuring beam which is backscattered from the fiber, said second acousto-optical modulator being capable of directing the backscattered beam away from the first acousto-optical modulator when the second acousto-optical modulator is in a first state, said second acousto-optical modulator being capable of shifting the frequency of the measuring beam by an acoustic frequency $f_a + f_z$ when the second acousto-optical modulator is in a second state different from the first state;
a receiver arranged to receive the local oscillator beam and arranged to receive the backscattered beam from the second acousto-optical modulator, said receiver producing an electric output signal in proportion to the intensity of the light beams incident thereon, said receiver having a frequency response greater than or equal to the frequency $f_z$; and
first means for exciting the first acousto-optical modulator into the second state for a short duration to direct a measuring beam pulse into the second acousto-optical modulator.

7. A reflectometer as claimed in claim 6, characterized in that the receiver receives the local oscillator beam directly from the frist acousto-optical modulator.

8. A reflectometer as claimed in claim 6, characterized in that the receiver receives the local oscillator beam via the second acousto-optical modulator.

9. A reflectometer as claimed in claim 6, characterized in that the states of the first and second acousto-optical modulators can be controlled independently.

10. A reflectometer as claimed in claim 9, characterized in that:
the first excitation means excites the first acousto-optical modulator into the second state for a short duration to direct a measuring beam pulse of frequency $f_o - f_a$ into the second acousto-optical modulator; and
the reflectometer further comprises second means for exciting the second acousto-optical modulator into the second state for a short duration to direct a measuring beam pulse of frequency $f_o + f_z$ into the optical fiber.

* * * * *